Patented Feb. 8, 1949

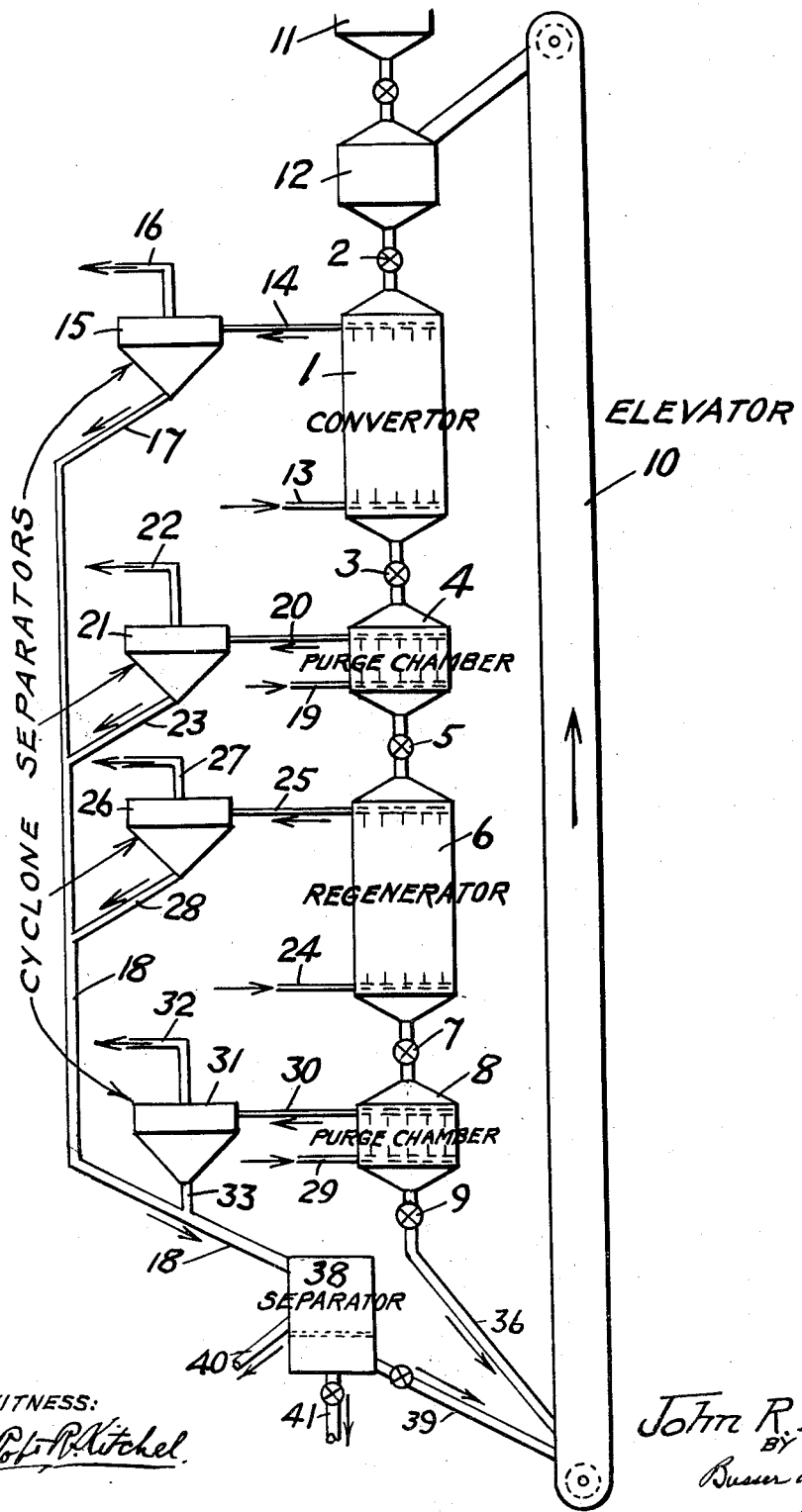

2,461,104

UNITED STATES PATENT OFFICE 2,461,104

METHOD OF CATALYSIS

John R. Bates, Swarthmore, Pa., assignor to Sun Oil Company, Philadelphia, Pa., a corporation of New Jersey Application September 14, 1945, Serial No. 616,169

3 Claims. (Cl. 23—1)

The present invention relates to a method of catalysis in which reactant vapors are contacted with a granular catalyst and in which the catalyst is subject to considerable mechanical handling. In such processes the handling or movement of the catalyst results in a considerable degradation in particle size of the catalyst and a substantial amount of the catalyst is frequently ground into fine dust which is not only of little or no value as a catalyst but is picked up by the reactant vapors and is removed from the conversion zone suspended or entrained in the reactant vapors and is therefore lost. The attrition losses of the catalyst in moving catalyst units are frequently so high that only relatively inexpensive materials may be employed as catalysts in such operations. An example of this is the catalytic conversion of hydrocarbons. In moving catalyst units employed for the conversion of hydrocarbons it has been found that the attrition losses are so high that the only catalyst which may be economically employed is a clay type catalyst. Other catalysts, particularly certain synthetic catalysts, which are frequently more effective for particular applications, are so expensive that the relatively large loss of such catalysts as fines in such moving catalyst units makes their use economically inadvisable. Efforts have been made to reduce the attrition loss of catalysts in moving catalyst units, but these efforts have generally been directed toward finding relatively hard catalysts which would stand movement and rubbing of the particles of catalyst against each other without any substantial formation of fines. It has also been suggested that the catalysts should be formed in substantially spherical shaped particles in order to reduce the grinding action due to the rubbing together of the individual particles. While these efforts to produce a catalyst which is not subject to high attrition losses have met with some success, they result in a substantial increase in the initial cost of the catalyst and do not completely prevent attrition losses.

The present process is directed to a method of handling the catalyst so that attrition losses are substantially reduced. The method embodied in the present invention is applicable to moving catalyst units employing either a relatively low cost clay type catalyst or more expensive synthetic catalysts. It is also applicable to catalysts which are specially processed so as to have relatively low attrition losses.

In order to fully describe the present invention there is attached hereto a sheet of drawings the single figure of which is a diagrammatic illustration of a moving catalyst unit adapted to employ the features of the present invention. Reference should now be made to the drawings.

As illustrated in the drawings 1 designates a converter to which granular catalyst is supplied through star valve 2 from supply hopper 12. A bed of catalyst is maintained in converter 1 and used catalyst may be continuously withdrawn from the bottom of converter 1 through star valve 3 at the same rate at which fresh catalyst is supplied to converter 1 through inlet 2. The catalyst removed from converter 1 through star valve 3 drops into purge chamber 4 wherein a bed of catalyst is maintained and from which the purged catalyst is withdrawn at a rate equivalent to that at which used catalyst is introduced thereinto, through star valve 5. From star valve 5 the purged catalyst falls into regenerating chamber 6 within which a bed of catalyst undergoing regeneration is maintained and from the bottom of which regenerated catalyst is withdrawn through star valve 7. From star valve 7 the regenerated catalyst falls into purge chamber 8, wherein the catalyst is purged and from the bottom of the purge chamber catalyst is removed through star valve 9 and flows through line 36 to conveyor 10 which elevates the regenerated and purged catalyst to catalyst supply hopper 12. Additional catalyst to make up for losses may be introduced from catalyst hopper 11 into supply hopper 12.

In the operation of the foregoing diagrammatically illustrated apparatus the reactant vapors to be converted are introduced through line 13 into the bed of catalysts in converter 1 at a point near the bottom thereof. The reactant vapors rise through the bed of catalysts and are removed from converter 1 through outlet line 14 after having undergone the desired chemical conversion. During the passage of vapors through converter 1 they may pick up a certain amount of fines and these will be removed along with the reacted vapors through line 14. In order to recover these fines the vapors flowing through line 14 may enter a suitable dust separator, for instance a cyclone separator 15, from which the vapors free of any entrained fines are removed through line 16 while the separated fines may be removed through line 17 and flow or be conveyed to line 18. In purge chamber 4 a suitable purging fluid, for instance superheated steam or some other inert gas, may be passed through the bed of used catalyst contained therein, the purge fluid being introduced through line 19, rising through the bed of catalyst and being removed from purge chamber 4 through line 20 together with any reactant vapors present in the used catalyst. The purge fluid and reactant vapors contained therein may flow to a cyclone separator 21 from which the purge fluid is removed through line 22 and any catalyst fines entrained in the fluids are removed through line 23 and flow to line 18. In regenerator 6 a suitable regenerating medium, for instance air to burn off any carbonaceous deposits on catalyst in case hydrocarbon fluids are being treated in converter 1, is introduced into the bed of catalysts maintained therein through line 24 at a point near the bottom of the bed of catalyst. The regenerating medium rises through the bed of catalyst in regenerator 6 and is removed therefrom through line 25 and flows to cyclone separator 26, the products of regeneration being removed therefrom through line 27 while any catalyst fines removed therefrom through line 28 flow to line 18. In purge chamber 8 any suitable purging fluid, for instance steam or other inert gas, is introduced in the bed of catalysts maintained therein through line 29, passes through the bed of catalysts and is removed from purge chamber 8 through line 30 together with any oxidizing gas or other regenerating medium which may be entrained in the catalyst. The used purge gas passes through line 30 to cyclone separator 31, the gaseous portion thereof is removed through line 32 and any catalyst fines are removed through line 33 and flow to line 18.

I have discovered that if a small but appreciable quantity of fines not larger than will pass through 150 or 200 mesh screening is maintained on particles of catalyst used in the apparatus, these fines will exert a lubricating action and prevent or decrease the attrition of the catalyst particles during their movement through the apparatus. It is believed by adding the fines to the body of flowing catalyst that the particles acquire what may be considered a coating thereon which prevents a grinding action of the particles with each other and hence the attrition is reduced substantially. All of the fines formed in the apparatus during its operation are directed from line 18 into a vibratory screen separator 38 from which a desired quantity of those that are not larger than 150 or 200 mesh are returned to the body of flowing catalyst preferably as indicated adjacent the inlet of conveyor 10 through valved line 39. The fines larger than 150 mesh are not employed in the process and these may be removed from separator 38 through the line 40.

By returning a predetermined small percentage of the selected fines to the catalyst at this point in the apparatus proper lubricating action by the fines is provided for all particles of the catalyst during their passage through the entire apparatus and hence more beneficial results are obtained. It is to be understood, however, that the fines may be returned to the apparatus at any selected point. For example, the fines from separators 15, 21, 26 and 31 may be further separated and those not larger than 150 or 200 mesh returned to the apparatus at any selected point.

Only a very small percentage of the selected fines are needed to effect a lubrication of the catalyst particles. The amount of the selected particles to be returned to the conveyer 10 to provide effective lubrication has been found to be less than one per cent and generally the amount will be of the order of .05 to .5 per cent by weight of the catalyst. Since the quantity of the selected lubricating fines collected in the separator 38 will for most operations be greater than the quantity required to effect the lubrication, the excess of selected fines may be removed from the apparatus through valved outlet 41 and only the required small percentage returned to the apparatus.

It will be understood that to the extent that reduction of attrition approaches the absolute, to that extent removal of powdered fines from the endless catalyst stream is unnecessary, since there could be no progressive accumulation of powdered fines. Since, however, my process does not necessarily contemplate absolute prevention of attrition, but only its reduction to a minimum, separation from the moving catalyst mass of some proportion of the powdered fines is necessary. Such separation, however, need not be continuous, since an increase in the proportion of powdered fines within the range .05 to .5 or 1% is permissible; and partial separation of powdered fines from the endless catalytic stream is necessary only when, from time to time, the progressive, but exceedingly slow, increase in the percentage of powdered fines exceeds or approaches the maximum permissible percentage of powdered fines in the endless catalyst stream above which further substantial attrition could not be prevented.

This application is a continuation-in-part of my application filed October 23, 1942, Serial No. 463,040, now abandoned.

What I claim and desire to protect by Letters Patent is:

1. In a catalytic operation in which fluids are contacted with a mass of catalyst of solid particles which moves continuously in an endless stream into, through, out of, and back to, a treating zone and in which the particles are subjected to mechanical attrition forming powdered fines of a degree of fineness greatly exceeding that of the particles of the moving catalyst mass and in which fines leave the treating zone entrained in escaping fluids, the method of minimizing such attrition which comprises removing the fines from the escaped fluids, separating from the removed fines those which are larger than 150 mesh and returning a small percentage of the remaining fines to the moving catalyst mass in order to lubricate the mass and thereby minimize attrition.

2. In a catalytic operation in which fluids are contacted with a mass of catalyst of solid particles which moves continuously in an endless stream into, through, out of, and back to, a treating zone and in which the particles are subjected to mechanical attrition forming powdered fines of a degree of fineness greatly exceeding that of the particles of the moving catalyst mass and in which fines leave the treating zone entrained in escaping fluids, the method of minimizing such attrition which comprises removing the fines from the escaped fluids, separating from the removed fines those which are larger than 150 mesh and returning to the moving catalyst mass such percentage of the remaining fines as will maintain thereon a predetermined percentage thereof to thereby lubricate the mass and thus minimize attrition.

3. In a catalytic operation in which fluids are contacted with a mass of catalyst of solid particles which moves continuously in an endless stream into, through, out of, and back to, a treating zone and in which the particles are subjected to mechanical attrition forming powdered fines of a degree of fineness greatly exceeding that of the particles of the moving catalyst mass and in which fines leave the treating zone entrained in escaping fluids, the method of minimizing such attrition which comprises removing the fines from the escaped fluids, separating from the removed fines those which are larger than 150 mesh and returning to the moving catalyst mass such percentage of the remaining fines as will continuously maintain between .05 and 1 per cent by weight of such fines in such mass.

JOHN R. BATES.

REFERENCES CITED

The following references are of record in the file of this patent:

UNITED STATES PATENTS

| Number | Name | Date |
|---|---|---|
| 2,331,433 | Simpson et al. | Oct. 12, 1943 |